(12) United States Patent
Lipovski

(10) Patent No.: US 7,142,877 B2
(45) Date of Patent: Nov. 28, 2006

(54) APPARATUS AND METHOD FOR AUTOMATICALLY MUTING RESTRICTED ELECTRONIC DEVICES IN RESTRICTED AREAS

(76) Inventor: G. Jack Lipovski, 1491 S. Meadows Dr., Austin, TX (US) 78758

( * ) Notice: Subject to any disclaimer, the term of this patent is extended or adjusted under 35 U.S.C. 154(b) by 158 days.

(21) Appl. No.: 10/687,024

(22) Filed: Oct. 16, 2003

(65) Prior Publication Data

US 2004/0087318 A1 May 6, 2004

Related U.S. Application Data

(63) Continuation of application No. 09/384,723, filed on Aug. 27, 1999, now Pat. No. 6,675,002.

(51) Int. Cl.
*H04Q 7/20* (2006.01)
(52) U.S. Cl. .............. 455/456.4; 455/456.1; 455/458; 455/567
(58) Field of Classification Search ........ 455/212, 455/218, 219, 221, 435, 458, 565, 567, 222, 455/223, 174.1, 194, 456.1, 456.4, 194.1; 375/219, 269, 272, 295, 301, 316, 329, 370; 370/282, 278
See application file for complete search history.

(56) References Cited

U.S. PATENT DOCUMENTS

| | | | |
|---|---|---|---|
| 5,014,294 A | 5/1991 | Kromenaker et al. | |
| 5,058,205 A | 10/1991 | Roehrs et al. | |
| 5,287,549 A | 2/1994 | Roehrs et al. | |
| 5,604,797 A | 2/1997 | Adcock | |
| 5,802,467 A | 9/1998 | Salazar et al. | |
| 5,926,756 A | 7/1999 | Piosenka et al. | |
| 6,400,814 B1 | 6/2002 | Adams | |
| 6,438,385 B1 | 8/2002 | Heinonen et al. | |
| 6,625,455 B1* | 9/2003 | Ariga | 455/456.1 |
| 6,832,093 B1* | 12/2004 | Ranta | 455/456.4 |
| 2004/0009778 A1* | 1/2004 | Makuta | 455/456.1 |

\* cited by examiner

*Primary Examiner*—CongVan Tran
(74) *Attorney, Agent, or Firm*—Cook, Alex, McFarron, Manzo, Cummings & Mehler, Ltd.

(57) ABSTRACT

A system, consisting of an ultrasonic transmitter and a receiver, is described for controlling certain electronic sound-generating and radio-frequency-generating devices. In restricted areas where the audible sound generated by these electronic devices is objectionable, one or more ultrasonic transmitters are placed to blanket the area, each emitting an ultrasonic signal periodically. In electronic devices having ultrasonic receivers, the receipt of this signal prevents the electronic device from generating or reproducing objectionable audible sound for a short period of time after receipt of this ultrasonic signal, which is slightly longer than the period in which the ultrasonic signal is sent.

86 Claims, 3 Drawing Sheets

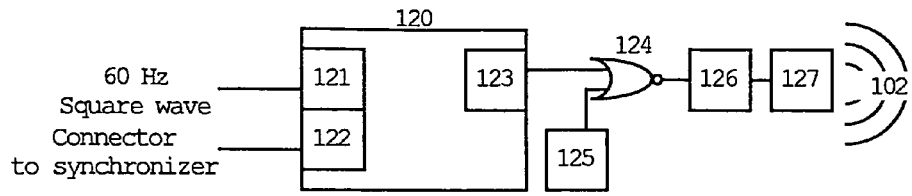

FIG. 4 volatile unsigned short EPDDR@0x10007002, EPDR@0x10007004, U0RX@0x10009000,
  U0TX@0x10009040, U0CR1@0x10009080, U0CR2@0x10009082,
  U0BRGR@0x10009084, U0SR@0x10009086, U0PCR@0x1000908A,
  EPPAR@0x10007000, EPFR@0x10007006;                                  — 129 enum{ UART_EN = 1, TXEN = 0x1000, RXEN = 0x100, IRTS = 0x4000, WS = 0x20,
  TRDY = 0x2000, RRDY = 0x100};                                        — 130

FIG. 5

```
void init() {
  U0BRGR=3333; /* 600 baud if system clock is 32 MHz */
  U0PCR = 2; // Txd pins used by UART0
  U0CR1 = UART_EN + TXEN; // enable UART transmitter
  U0CR2 = IRTS + WS; // disable hardware RTS control, have 8-bit data frame
  EPPAR = 5; // make both inputs rising edge sensitive
}
void put() { short i; static char count;
  if(((i = EPFR) & 1) == 0) return;
  EPFR = i; if(i & 2) count = 0;
  if((((count++) & 3) == 0) && (U0SR & TRDY)) U0TX = 0x8d;
}
```

FIG. 6

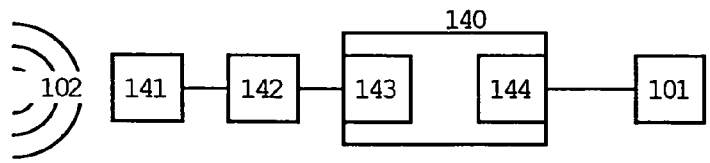

FIG. 7

```
                        150
void init(){         ─────⏋                                   151
   U0BRGR=3333; /* 600 baud if system clock is 32 MHz */   ───⏋
   U0PCR = 1; // Rxd used by UART0
   U0CR1 = UART_EN + RXEN; // enable UART receiver
   U0CR2 = IRTS + WS; // disable hardware RTS control, have 8-bit data frame
   EPDDR = 1; // make port bit 0 an output
}                                                          152
                               153
void check() { short i = 0, j;  ─────⏋
   while(U0SR & RRDY) {
      if((j = U0RX) & 0x4000) ;                                    154
         else if(j == 0x8d) i = 1; // output 1 to mute device      155
         else if(j == 0xae) timeout = N; // mute for next 3 hours  156
         else if(j == 0xe6) timeout = 0; // cancel mute timeout    157
   }                                                               158
                                159
   if(timeout) i = 0; //  ──────── 160
   EPDR = i; // output chosen value  ── 161
}
```

FIG. 8

APPARATUS AND METHOD FOR AUTOMATICALLY MUTING RESTRICTED ELECTRONIC DEVICES IN RESTRICTED AREAS

CROSS-REFERENCE TO RELATED APPLICATION

This application claims benefit as a Continuation of application Ser. No. 09/384,723, filed Aug. 27, 1999 now U.S. Pat. 6,675,002.

BACKGROUND OF THE INVENTION

This invention is in the field of automatically muting electronic devices that emit sound or radio frequency signals, where muting means inhibiting generation or reproduction of objectionable electronic sound or radio signals, or reducing such sound or radio signals to an acceptable level.

People attending a concert or similar event, are distracted and irritated when cellular telephones and pagers ring. During a quiet and delicate passage, a musician can be distracted by a ringing cell phone, stopping the performance. Attendees at churches, synagogues, lecture halls, and even restaurants are similarly distracted by cellular telephones, pagers, wrist watches, and other electronic devices that reproduce or generate audio signals. Cell phones should not be used in airplanes. However, individuals do not have the courtesy to turn these devices off, or at least mute them, when they might distract others or interfere with navigation.

Nevertheless, it is possible to automatically mute these devices by making a signal present in the concert hall, or similar area (restricted area), or through entrances or exits to these areas, which can be received by the offending devices (restricted device). This inventive apparatus will automatically mute all restricted devices in restricted areas, provided that restricted areas, or entrances to, and possibly exits from, the areas are equipped with a transmitter apparatus, and all restricted devices are fitted with a receiver apparatus, according to this invention.

SUMMARY OF THE INVENTION

According to the present invention, there is provided a system for selectively restricting the transmission of a cellular telephone within a defined restricted communication area. The system includes a transmitter for generating a control signal at the entrance of the area with a receiver subsystem within the cellular phone responsive to the control signal. A transmitter-inhibit subsystem inhibits the cellular telephone's radio-frequency carrier transmission within the area in response to a restricted communication signal.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify the elements, and in which:

FIG. 4 is a preferred embodiment design of a transmitter.

FIG. 5. is a C language declaration of ports used in FIG. 6 and FIG. 8.

FIG. 6 is a pair of C language procedures executed in the transmitter.

FIG. 7 is a preferred embodiment design of a receiver.

FIG. 8 is a pair of C language procedures executed in the receiver.

DESCRIPTION OF THE PREFERRED EMBODIMENT

A high-level view of the operation of this apparatus is presented first. Then a concrete design of a preferred embodiment is presented later.

Figure 1:
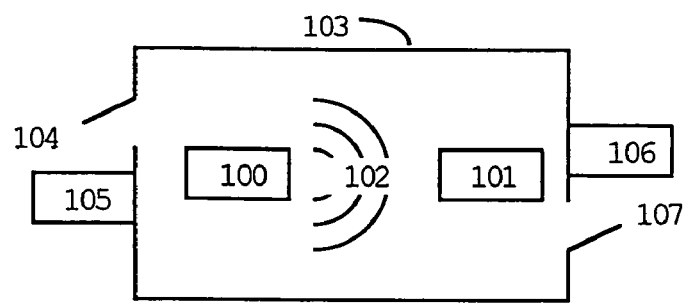
FIG. 1 is a top plan view of the general organization of the system constructed in accordance with the general principles of the present invention.

FIG. 1 illustrates the general organization of this apparatus. A restricted area 103 may be protected by one of three operating modes or a combination thereof. In a first mode, the restricted area has one or more control signal transmitters 100, and one or more restricted devices 101 may be carried by persons in the area. The control signal 102 passes throughout (blankets) the restricted area 103. Whenever restricted device 101 receives the control signal 102, it will be muted. Alternatively in a second operation mode, a first control signal transmitter 105 may be placed by each entrance 104 to a restricted area 103, and a second control signal transmitter 106 may be placed by each exit 107 from a restricted area 103. When a restricted device 101 receives a control signal from first control signal transmitter 105, it is muted until the restricted device 101 receives a control signal from second control signal transmitter 106. In a variation of this mode, for instance in an airport jetway, a second control signal is emitted near the airport terminus of the jetway, and the first control signal is emitted near the airplane terminus of the jetway. As a restricted device passes through the jetway into an airplane, the last-met signal mutes the device before it enters the airplane, and as a restricted device passes through the jetway out of an airplane, the last-met signal restores the device to the non-muted state before it enters the airport. Finally, in a third operating mode, a control signal transmitter 105 may be placed by each entrance 104 to a restricted area 103. Upon receipt of a control signal from control signal transmitter 105, a restricted device 101 is muted for a period of time, such as three hours.

In this preferred embodiment, essentially the same hardware is used for all three modes to reduce cost. The preferred control signal is ultrasound, because in an area-blanketing mode, this signal should have radiation coverage that is similar to the objectionable sound that it mutes, but must not be objectionable itself. But without departing from the spirit of this invention, any combination of the aforementioned modes may be implemented, each mode may use different hardware, or the control signal can be limited-range radio wave, infrared signal, or other local signal that can broadcast over the entire restricted area, possible by using multiple transmitters in the restricted area, and not broadcast significantly, or be present coincidentally, beyond this area.

Figure 2:
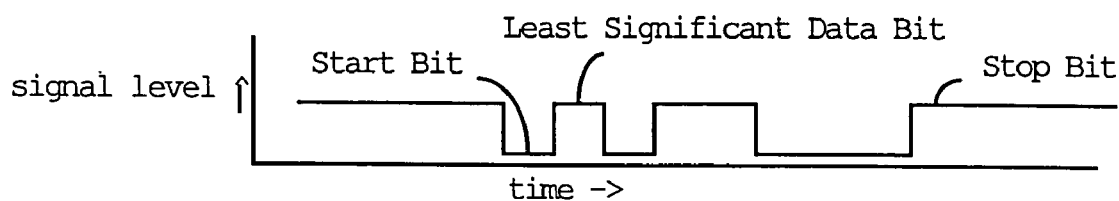
FIG. 2 is a description of a control signal sent from transmitter to receiver.

The ultrasonic signal should be an unusual pattern of ultrasonic bursts. Otherwise devices like ultrasonic pest deterrents and ultrasonic distance measurement devices, which emit continuous ultrasonic energy, or simple repetitions of ultrasonic energy, might be used in nonrestrictive areas. Such ultrasonic transmitters should not accidentally mute restricted devices. Restricted electronic devices are generally controlled by microcontrollers. Most microcontrollers have at least one UART (Universal Asynchronous Receiver-Transmitter (or equivalent) module), or if not, may such UART modules are already designed and can be inexpensively included in the design of a special microcontroller used in restricted devices. Therefore, the ultrasonic signal should be modulated by a communication from (or packet) signal that is sent and that will be received by UARTs. This preferred embodiment will utilize three UART frames sent at 600 baud, having no parity bit and one stop bit, which (1) have binary pattern 10001101 or hexadecimal pattern in C notation, 0x8d (FIG. 2 shows such a signal at output RxD 123 in FIG. 4), (2) have binary pattern 10101110 or hexadecimal pattern in C notation, 0x8d (FIG. 2 shows such a signal at output RxD 123 in FIG. 4), (2) have binary pattern 10101110 or hexadecimal pattern 0xae, or (3) have binary pattern 11100110 or hexadecimal pattern 0xe6; each frame has a variation of single bit-wide pulses, and multiple bit-wide pulses, which is unlikely to appear in patterns generated by naturally occurring sources or in use for other communication or control applications. However, another communication frame structure, or a signal not presently used for communication, can be used without departing from the spirit of this invention.

Figure 3:
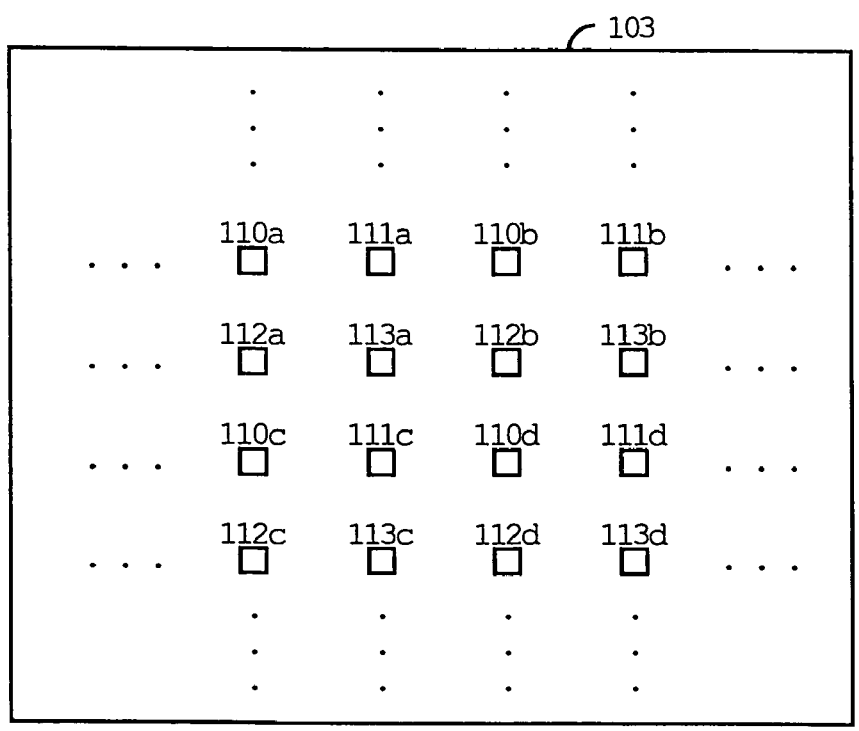
FIG. 3 is a description of a layout of multiple transmitters to cover a large restricted area.

The following discussion pertains mainly to area-blanketing transmitters 100. A pattern frame from transmitter 100 should be sent repetitively, but no signal should be sent for multiple frame times, so that if a plurality of transmitters are needed to cover a restricted area, different transmitters can transmit their frame at different times without interfering with other transmitters. This should be done so that a restricted device will receive a frame from at least one of the transmitters without interference from another transmitter that might cancel the signal. Further, if a signal is sent from a transmitter, and if interference from a reflected signal from the same transmitter cancels its signal, the restricted device should be able to receive a frame from another transmitter without it being cancelled. In this preferred embodiment, a frame is sent every four frame times by one transmitter. If a large number of transmitters are needed to cover a restricted area, transmitters can be arranged in a repetitive two-dimensional array pattern as shown in FIG. 3, where for purposes of description, transmitters are arranged in rows numbered consecutively from top to bottom, and in columns numbered consecutively from left to right. The transmitters will be synchronized to insure that any restricted device in the restricted area will receive at least one signal without cancellation by a signal sent by another transmitter. Each transmitter will send its frame in a time slot, and repeated each four time slots after that. A transmitter (110a, 110b, ...) in an even numbered row and even numbered column will send its frame in a frame time slot zero. A transmitter (111a, 111b, ...) in an even numbered row and odd numbered column will send its frame in a time slot one. A transmitter (112a, 112b, ...) in an odd numbered row and even numbered column will send its frame in a frame time slot two. A transmitter (113a, 113b, ...) in an odd numbered row and odd numbered column will send its frame in a frame time slot three. In restricted area, any restricted device, receiving a signal from two different transmitters that might interfere with each other, will receive a signal from some other transmitter. This transmitter will be much closer to the receiver than any other transmitter that is sending a signal in the same frame time slot. Thus, a restricted device will receive a frame from at least one transmitter, without risk of cancellation by a signal from another transmitter. A control signal received from any transmitter will mute the restricted device for a time that is at least as long as the time between signals from that transmitter, which is four time slots in this preferred embodiment. When the restricted device is removed from the restricted area, it will not receive the control signal, and will not be muted. Use of another periodic frame structure, other than sending a frame every four frame times, does not significantly depart from the spirit of this invention. Sending frames in nonrepetitive manner which are not synchronized with each other, such as sending frames at random times, but with a predetermined maximum time between frames, does not significantly depart from the spirit of this invention.

The following discussion pertains to transmitters at entrance 105 and transmitters at exits 106. These transmitters should generate distinct frame patterns that are different from the frame pattern 0x8d chosen for area-blanketing transmitters 100. The frame pattern 0xae is generated by entrance transmitters 105 and the frame pattern 0xe6 is generated by exit transmitters 105. Upon receipt of an entrance frame pattern 0xae, the receiver will be muted, until an exit frame pattern 0xec is received. However, the exit transmitter 106 might be inoperable or the electronic device 101 might be taken out of the restricted area without passing through an exit. In this case, the device 101 may be automatically restored to its non-muted state after a long period of time, such as three hours, after it has been muted by an entrance frame pattern 0xae. In fact, if the device 101 is automatically restored to its non-muted state after a period of time, and that period of time is predetermined and is deemed acceptable for the event taking place in the restricted area, an exit signal may not be needed. However, a different period of time than three hours, or the absence of a timeout period, or a period of time that is selectable by sending different entrance frame patterns, can be used without departing from the spirit of this invention. Moreover, there being two to the power eight, 256, different frame patterns, only a few of which might be generated by pest deterrents and other devices used in non-restricted areas so they should not be used in this apparatus, many different frame patterns can be transmitted by entrance transmitters 105 to selectively mute either radio-frequency generation or audio generation, or both, and to selectively mute for various time periods such as ten minutes, twenty minutes, half an hour, and so on, until the device returns automatically to a non-muted state, or muted indefinitely, until an exit signal returns the device to a non-muted state.

A preferred embodiment design of an area-blanketing transmitter (100) is shown in FIG. 4. Microcontroller 120 may be an inexpensive low-power microcontroller designed for battery use, such as the Motorola MMC2001. For the detailed preferred embodiment following in this specification, the Motorola MMC2001 Reference Manual (MMC2001RM/D) is incorporated by reference. Parallel port EPDR bit 0 121 inputs a signal derived from household 110 volt 60 Hertz signal that is used to time the transmission of the control signal, the parallel port EPDR bit 1 122 inputs a signal from a connector that can be used to synchronize the signal to be sent in a selected frame time. Serial port TXD0 os connected to a NOR gate 124 whose other input is the output of 555 timer chip 125 that generates a 40 KHz wave form. Output of NOR gate 124 is connected to an amplifier 126 that drives an ultrasonic transducer 127. When UART signal 123 is low, NOR gate 124 outputs a high signal, and transducer 127 generates a 40 KHz ultrasonic signal.

The C language declarations in FIG. 5 are included in the program for an area-blanketing transmitter (FIG. 6) and in the program for a receiver (FIG. 8). The first statement 129 indicates the location of I/O ports in the MMC2001; for instance, the first declaration indicates a 16-bit port called EPDDR at location 0x10007002. The second statement 130 indicates constant values that may be combined and stored in I/O ports; for instance the first definition UART_EN=1 indicates a symbolic name UART_EN will have a value of 1.

C language procedures for the area-blanketing transmitter are shown in FIG. 5. Procedure init ( ) 131 is executed just after the microcontroller is reset, to configure the I/O devices. Line 132, and the following four lines, initialize UART0 600 Baud transmission of 8-bit data frames with no parity and one stop bit (assuming the MMC2001 has a 32 MHz clock rate). Line 133 initialize the edge port to recognize rising edge signals on edge port pins. Procedure put ( ) 134 is executed at least once every $60^{th}$ of a second, but can be executed more often in a loop if the remaining programs running in the microcontroller execute a loop in less than a $60^{th}$ of a second. A rising edge of the 60 Hz square wave sets bit zero of port EDFR. Line 135 causes the procedure to return to the calling program if an edge did not occur. Line 136 clears the bits in EDFR that had been set to 1. To cause a transmitter to synchronize to the current 60 Hz period, a pulse is applied via a connector to bit 1 of the EDFR device, setting it. If bit 1 of EDFR was set when bit zero became set, then the static local variable COUNT is cleared. COUNT is incremented; if COUNT is an integer multiple of four, the pattern 0x8d is written into the UART transmit register, causing pattern 0x8d (FIG. 2) to be sent out 137. Thus, a transmitter 100 broadcasts an area-blanketing signal once very four periods of a 60 Hz waveform, and each frame, having 8 data, no parity, and one stop bits at 600 baud, is equal to a 60 Hz period, so it does not interfere with a frame sent by another transmitter that is close to it.

A transmitter for an entrance 105 or a transmitter for an exit 106 can be implemented in similar manner to that described above. It need not be synchronized to other transmitters, however, and it may emit its frame pattern continuously, such that after one frame ends and the same frame is sent again. By implementing transmitters for area-blanketing, entrance and exit, using the same microcontroller, a single device, suitably configured, can be used for each use. Indeed, a device first configured for an entrance can later be configured for an exit when an event is over.

A preferred embodiment design of a receiver and its connections to restrict device 1001 is shown in FIG. 6. Microcontroller 140 may be an inexpensive low-power microcontroller such as the aforementioned Motorola MMC2001. Signal output of ultrasonic transducer 141 is amplified, filtered, and detected by analog hardware 142 which sends a digital signal to serial input port RxD0, 143. When a 40 KHz ultrasonic wave is detected by transducer 141 analog hardware 142 outputs a low digital signal. Parallel port EPDR bit 0 (144) outputs a signal which is applied to the sound generating or reproducing device 101 to mute it; when this signal is high, sound output is muted.

Unfortunately, a restricted device may completely be turned off when it is passed through an entrance or exit, thereby making it unable to receive and process entrance and exit frames. However, microcontrollers such as Motorola MMC2001 have low-power stop and doze modes, whereby the microcontroller, though turned off to conserve battery power, can be put in the run mode upon receipt of a signal such as the output of analog hardware 142. The microcontroller would be maintained in a stop or doze mode. Then it can be put into a run mode upon receipt of a signal from analog hardware 142 to respond to entrance and exit frames.

C language procedures for the receiver are shown in FIG. 8. Procedure init ( ) 150 is executed just after the microcontroller is reset, to configure the I/O devices. Line 151, and the following four lines, initialize UART0 for 600 baud reception of 8-bit data frames with no parity and one stop bit (assuming the MMC2001 has a 32 MHz clock rate). Line 152 initializes the edge port to output a muting signal on edge port bit 0. Procedure check ( ) 153 is executed slightly less often than every $15^{th}$ of a second. UART frames that arrive in the meantime are stored in a hardware queue; each frame's data is read from this queue by reading a byte from port U0TX. Line 154 checks for the presence of a frame's data in the hardware queue. As long as there is data in the queue, line 155 reads the data. If the frame was received in error, nothing is done (line 155), otherwise if the area blanketing frame 0x8d is received, local variable i is set equal to 1 (line 156) to mute the electronic device, otherwise if the entrance frame 0xae is received, global variable timeout is set equal to constant N (157) to mute the electronic device for the next three hours, otherwise if the exit frame 0xe6 is received, global variable timeout is cleared (line 158) to restore the electronic device to its non-muted state. If timeout is nonzero, local variable i is set to 1 (line 160) to mute the electronic device. Local variable i is output into port EPDR, where a value of 1 mutes the restricted device (line 161). The variable timeout is periodically decremented. (The program segment for this periodic decrement function is not shown, there being several ways to do this, which are not important to this invention.) The value N (159) is selected such that, unless timeout is prematurely cleared, timeout will become zero is a predetermined time, which is three hours in this preferred embodiment. Thus, if any frame is received without error, having a pattern 0x8d that is sent by area-blanketing transmitter 100, the mute signal is asserted and the objectionable audio signal is not produced, and if any frame is received without error, having entrance pattern 0xae sent by transmitter 105, the mute signal is asserted and the objectionable audio signal is not produced for the next three hours, or until exit pattern 0xe6 is received.

Occasionally a need may arise to override the automatic mute control, for instance to permit an emergency telephone signal to ring the cell hone even though it is muted, or for instance to restore a device that is accidentally muted. However, overriding should not be so easy as to defeat the objective of this invention. A command should be able to be sent from a controlled source, such as a service department's telephone hot line, to override the mute control. Request authorization to override the muting capability should be administered by the service department so as to prevent users from flagrantly disabling the muting capability, yet handle valid exceptions to automatic control. A communication channel will send the command from the service center to the electronic device. In this preferred embodiment, a command may be sent on a cell phone channel. This message can be carried by a signal that is modulated using a frequency-shift keying, which is also used in modems and faxes. The signal will be modulated using a UART frame structure, for reasons discussed earlier in this specification. Hardware and software for this preferred embodiment is similar to that for receiving control signals in a restricted device, as in FIG. 8. whereas the control signal receiver user UART device numbered zero, there is a second UART device, numbered one, with the same functionality as UART device numbered zero, that can be coupled through a modem device of known design to the cell phone's audio channel. So, in the interests of brevity, this hardware and software will not be further described in this specification. In order to make unauthorized generation or duplication of these commands somewhat more difficult, the electronic device's phone number and the current time will be sent in the commands, to prevent one command from disabling many devices or from being repeatedly used to disable the same device (the time sent in the command can be compared to the current time, which is maintained in most cell phones). At least a simple encryption technique will be used to make construction of these messages more difficult, such as appending a check sum to the end of the message which is the sum of all the bytes in the message. This can be used to foil counterfeiters of commands who are unskilled in the art of communication protocols. However, without departing from the spirit of this invention, any communication channel such as a regular telephone line or a pager channel can be used; the command may be sent on different carriers than frequency-shift keying, such as amplitude modulation; the command may be modulated using different communication frame structures; the command may be composed using different frame sequences; and the command may be secured using more powerful encryption techniques.

Two mechanisms may be used to restrict the use of control signal transmitters. In a first mechanism, a command may likewise be able to be sent from a controlled source, such as a service department's telephone hot line, through a communication channel to enable and configure a transmitter of control signals. Authorization to enable and configure a signal transmitter should be administered by the service department so as to limit the risk that a transmitter apparatus might be used mischievously or maliciously. In this preferred embodiment, a command may be sent on a telephone channel, carried by a signal that is modulated using frequency-shift keying, modulated using a UART frame structure, for reasons discussed earlier in this specification. Again, hardware and software for this preferred embodiment is similar to that for receiving control signals in a restricted device, as in FIG. 8. So, in the interests of brevity, it will not be further described in this specification. The command will contain a signal byte which will be transmitted by the transmitter receiving the command. In order to make unauthorized generation or duplication of these commands a bit harder, the transmitter should have a unique computer-readable serial number; the command will have this serial number and the current time, to prevent one command from being used to enable and configure other unauthorized transmitters or from being repeatedly used to enable the same transmitter, because the time can be compared to the current time that can be maintained in the transmitter. At least a simple encryption technique will be used to make construction of these commands more difficult, such as appending a check sum to the end of the message which is the sum of all the bytes in the message. This can be used to foil counterfeiters of commands who are unskilled in the art of communication protocols. However, without departing from the spirit of this invention, any communication channel such as a cell telephone line or a pager channel can be used; the command may be sent on different carriers than frequency-shift keying, such as amplitude modulation; the command may be modulated using different communication frame structures; the command may be composed using different sequences of frames, such as containing a range of serial numbers and a range of times, instead of a single serial number and a single time for which a command is valid; and the command may be secured using more powerful encryption techniques.

Alternatively, in a second mechanism, the transmitter can be enabled and configured by plugging into it a small cartridge, containing a removable non-volatile memory such as an electrically erasable programmable read-only memory (EEPROM). Such a cartridge has been commonly used to load games into personal computers or game players, and is similar to a "smart card" or magnetically recorded credit card. The techniques for programming such a non-volatile memory, and for connecting such a non-volatile memory to a transmitter device, are well-known to one skilled in the art. In this alternative preferred embodiment, a service department will write the EEPROM and mail it to the transmitter's user. Authorization to enable and configure a signal transmitter should be administered by the service department so as to limit the risk that a transmitter apparatus might be used mischievously or maliciously. The EEPROM will be read by the transmitter to enable and configure its control signals. The EEPROM will store a signal byte which will be transmitted by the control signal transmitter reading the EEPROM. In order to make unauthorized generation or duplication of these commands a bit harder, the transmitter should have a unique computer-readable serial number; the EEPROM will store this serial number and the current time, to prevent one EEPROM from being used to enable and configure other unauthorized transmitters or from being repeatedly used to enable the same transmitter, because the time can be compared to the current time that can be maintained in the transmitter. At least a simple encryption technique will be used to make construction of these EEPROMs more difficult, such as appending a check sum to the end of the message which is the sum of all the bytes in the message. This can be used to foil counterfeiters of commands who are unskilled in the art of construction of data records. However, without departing from the spirit of this invention, a read-only memory (ROM), a magnetic stripe, or alternative nonvolatile memory may be used in place of an EEPROM, the format of data in the card might be modified to contain, for instance, a series of dates and range of serial numbers, for which authorization is given, and a more elaborate encryption code can be used.

An important aspect of this invention is its low cost. A restricted device can be modified by the modification of a cell phone mouthpiece to also receive the ultrasonic signals, or else by the addition of an ultrasonic transducer. Analog circuitry is also needed to amplify, filter, and detect the ultrasonic signal. The UART hardware may be on the microcontroller already, or can be added at low cost because UART designs are widely reproduced. The restricted device microcontroller's program need not be greatly expanded. Thus the hardware and software needed to implement this valuable function in receivers will not be expensive. Also, transmitters will similarly be inexpensive.

As opposed to a radio-interference device, this inventive apparatus does not jam a radio-frequency signal carrier. Unidirectional or bidirectional radio transmission may be still permitted, while objectionable audible or radio-frequency output is muted. As opposed to infrared remote controls, which mute television sets and similar home entertainment devices, this inventive apparatus broadcasts the same mute control signal from possibly more than one transmitter, to all receivers. By contrast, infrared remote controls for televisions and stereos are designed, as much as possible, to control just one device from one transmitter, such that other devices ignore the control. Finally, this inventive device solves an onerous problem, as restricted devices are widely used and are expected to become even more widely used, which no other apparatus attempts to solve.

Modifications to this invention can be made by one skilled in the art without departing from the spirit of the invention. Instead of sending the objectionable audio signal, which the signal is muted, an optional part of the apparatus can include automatic means to store the message being sent, as in voice-mail, or to inform the sender, by means of a special tone or sequence of tones, that the receiver is in a restricted area and cannot hear the sound. Another optional part of the apparatus can include a vibrator or other non-objectionable indicator that is automatically enabled instead of the objectionable audio sound, when the receiver is in a restricted area. Further, the objectionable audio signal may be reproduced or generated in the microcontroller's software. The muting operation can be implemented in software, rather than being done through a signal that is output from the microcontroller, as is illustrated herein. Or it can be implemented by a mechanical or electro-mechanical coupling. While the invention has been described in connection with an illustrative embodiment, obvious variations therein will be apparent to those skilled in the art without the exercise of invention, accordingly the invention should be limited only to the scope of the appended claims.

While a particular embodiment of the invention has been shown and described, it will be obvious to those skilled in the art that changes and modifications may be made therein without departing from the invention in its broader aspects, and, therefore, the aim in the appended claim is to cover all such changes and modifications as fall within the true spirt and scope of the invention.

I claim:

1. A system for selectively restricting the radio frequency transmission of a cellular telephone within a defined restricted-communication area, comprising:
    a transmitter for generating a control signal at an entrance to the restricted-communication area, said transmitter having a broadcast area not being coextensive with the restricted-communication area;
    the cellular telephone including a subsystem for transmitting a cellular telephone audio signal on a radio-frequency carrier;
    a receiver subsystem within the cellular phone responsive to said control signal, for generating a restricted-communication signal upon receipt of said control signal and for a predetermined time thereafter;
    a transmitter-inhibited subsystem responsive to said restricted-communication signal that inhibits said radio-frequency carrier transmission within the restricted-communication area; and
    an override mechanism within the cellular telephone responsive to a command set over said radio-frequency carrier, wherein the override mechanism can cause the cellular telephone to ignore the restricted communication signal, thereby permitting radio-frequency carrier transmission within the restricted-communication area.

2. A system as defined in claim 1 wherein said control signal is ultrasonic.

3. A system as defined in claim 2 wherein the cellular telephone includes a microphone responsive to the voice of the user, and said control signal receiver subsystem utilizes said microphone for receiving said ultrasonic control signal.

4. A system as defined by claim 1 wherein said control signal is infrared.

5. A system as defined by claim 1 wherein said control signal is a radio frequency signal.

6. A system for selectively restricting the radio frequency transmission of a cellular telephone within a defined restricted-communication area, comprising:
    a first transmitter for generating a first control signal at an entrance to a restricted-communication area, said first transmitter having a broadcast area not coextensive with the restricted-communication area, and said control signal being different from the electromagnetic signal conveying said cellular telephone audio signal;
    a second transmitter for generating a second control signal at an exit from a restricted-communication area, said second transmitter having a broadcast area not coextensive with the restricted-communication area, and said control signal being different from the electromagnetic signal conveying said cellular telephone audio signal;
    the cellular phone including a subsystem for transmitting a cellular telephone audio signal on a radio-frequency carrier;
    a receiver subsystem within the cellular phone responsive to said control signals, for generating a restricted-communication signal upon receipt of said first control signal for a predetermined time or until receipt of said second control signal;
    a transmitter-inhibit subsystem, responsive to said restricted-communication signal, that can inhibit said radio-frequency carrier transmission within the restricted-communication zone; and
    an override mechanism within the cellular telephone responsive to a command sent over said radio-frequency carrier, wherein the override mechanism can cause the cellular telephone to ignore the restricted communication signal, thereby permitting radio-frequency carrier transmission within the restricted-communication area.

7. A system as defined in claim 6 in which said control signal is ultrasonic.

8. A system as defined in claim 7 wherein the cellular telephone includes a microphone responsive to the voice of the user, and said control signal receiver subsystem utilizes said microphone for receiving said ultrasonic control signal.

9. A system as defined in claim 6 wherein said control signal is infrared.

10. A system as defined in claim 6 wherein said control signal is a radio frequency signal.

11. A system for selectively restricting the radio frequency transmission of a cellular telephone within a defined restricted-communication zone, comprising:
    a plurality of transmitters for repetitively generating a control signal within the restricted-communication area, said control signal being different from the electromagnetic signal conveying said cellular telephone audio signal;
    a synchronization subsystem whereby at least one of said control signal transmitters are prevented from transmitting while another said control signal transmitter transmits its control signal, each said control transmitter transmitting its control signal repetitively within a maximum time interval between said transmissions;
    the cellular phone including a subsystem for transmitting a cellular telephone audio signal on a radio-frequency carrier;
    a receiver subsystem within the cellular phone responsive to said control signal, for generating a restricted-communication signal upon receipt of said control signal and for a time longer than the longest time between any said control signal transmitters' sending consecutive signals; and a transmitter-inhibit subsystem responsive to said restricted-communication signal that can inhibit said radio-frequency carrier transmission within the restricted-communication area.

12. A system as defined by claim 11 wherein said synchronization subsystem uses common 60 Hz household power to establish which of said transmitters send their control signal during each half of the 60 Hz cycle.

13. A system as defined by claim 11 wherein said control signal is ultrasonic.

14. A system as defined in claim 13 wherein the cellular telephone includes a microphone responsive to the voice of the user, and said control signal receiver subsystem utilizes said microphone for receiving said ultrasonic control signal.

15. A system as defined by claim 11 wherein said control signal is infrared.

16. A system as defined by claim 11 wherein said control signal is a radio frequency signal.

17. A cellular telephone including a subsystem for transmitting a cellular telephone audio signal on a radio-frequency carrier, wherein said radio frequency transmission is inhibited upon receipt of a control signal generated at the entrance to a defined restricted-communication area, said cellular telephone comprising: a receiver subsystem within the cellular phone responsive to said control signal, for generating a restricted-communications signal upon receipt of said control signal, and for a predetermined time thereafter; and a transmitter-inhibit system responsive to said restricted-communication signal that inhibits said radio-frequency carrier transmission within the restricted-communication area; and an override mechanism within the cellular telephone responsive to a command set over said radio-frequency carrier, wherein the override mechanism can cause the cellular telephone to ignore the restricted communication signal, thereby permitting radio-frequency carrier transmission within the restricted-communication area.

18. A cellular telephone as defined in claim 17 wherein said control signal is ultrasonic.

19. A cellular telephone as defined in claim 18 wherein the cellular telephone includes a microphone responsive to the voice of the user, and said control signal receiver subsystem utilizes said microphone for receiving said ultrasonic control signal.

20. A cellular telephone as defined in claim 17 wherein said control signal is infrared.

21. A cellular telephone as defined by claim 17 wherein said control signal is a radio frequency signal.

22. A cellular telephone including a subsystem for transmitting a cellular telephone audio signal on a radio-frequency carrier, wherein said radio frequency transmission is inhibited upon receipt of a first control signal generated from a first control signal transmitter at an entrance to a defined restricted-communication area, and re-enabled upon receipt of a second control signal generated from a second control signal transmitter at an exit from said defined restricted-communication area, said cellular telephone comprising:

a receiver subsystem within the cellular phone responsive to both said control signals, for generating a restricted-communication signal upon receipt of said first control signal until receipt of said second control signal;

a transmitter-inhibit subsystem responsive to said restricted-communication signal that can inhibit said radio-frequency carrier transmission within the restricted-communication area; and an override mechanism within the cellular telephone responsive to a command sent over said radio-frequency carrier, wherein the override mechanism can cause the cellular telephone to ignore the restricted communication signal, thereby permitting radio-frequency carrier transmission within the restricted-communication area.

23. A cellular telephone as defined in claim 22 wherein said control signal is ultrasonic.

24. A cellular telephone as defined in claim 23 wherein the cellular telephone includes a microphone responsive to the voice of the user, and said control signal receiver subsystem utilizes said microphone for receiving said ultrasonic control signal.

25. A cellular telephone as defined in claim 22 wherein said control signal is infrared.

26. A cellular telephone as defined in claim 22 wherein said control signal is a radio frequency signal.

27. A cellular telephone including a subsystem for transmitting a cellular telephone audio signal on a radio-frequency carrier, wherein said radio frequency transmission is inhibited upon receipt of a control signal generated from any of a plurality of control signal transmitters within a defined restricted-communication area, in which a synchronization subsystem coupled to said transmitters causes at least one said control signal transmitter to avoid transmitting while another said control signal transmitter transmits its control signal, each said control transmitter transmitting its control signal repetitively with a maximum time interval between said transmissions, said cellular telephone comprising:

a receiver subsystem within the cellular phone responsive to said control signal, for generating a restricted-communication signal upon receipt of said control signal and for a time thereafter greater than said maximum time interval; and a transmitter-inhibit subsystem responsive to said restricted-communication signal that can inhibit, for a predetermined time, said radio-frequency carrier transmission within the restricted-communication area.

28. A cellular telephone as defined in claim 27 wherein said control signal is ultrasonic.

29. A cellular telephone as defined in claim 28 wherein the cellular telephone includes a microphone responsive to the voice of the user, and said control signal receiver subsystem utilizes said microphone for receiving said ultrasonic control signal.

30. A cellular telephone as defined in claim 27 wherein said control signal is infrared.

31. A cellular telephone as defined in claim 27 wherein said control signal is a radio frequency signal.

32. A method for selectively restricting the emission of a radio frequency signal from a cellular telephone within a defined restricted-communication area, comprising the steps of:

generating a control signal at an entrance to said restricted-communication area said control signal not being coextensive with said restricted-communication area, and said control signal being different from the electromagnetic signal conveying said cellular telephone audio signal;

generating a restricted-communication signal within the cellular phone upon receipt of said control signal, and for a predetermined time thereafter;

applying the restricted-communication signal to the radio frequency transmitter to inhibit its emission within the restricted-communication zone; and overriding the restricted-communication signal within the cellular telephone in response to a command set over said radio-frequency carrier, thereby permitting radio-frequency carrier transmission within the restricted-communication area.

33. A method as defined in claim 32 wherein said control signal is ultrasonic.

34. A method as defined in claim 33 wherein the cellular telephone includes a microphone responsive to the voice of the user, and said control signal receiver subsystem utilizes said microphone for receiving said ultrasonic control signal.

35. A method as defined in claim 32 wherein said control signal is infrared.

36. A method as defined in claim 32 wherein said control signal is a radio frequency signal.

37. A method for selectively restricting the emission of a radio frequency signal from a cellular telephone within a defined restricted-communication area, using a first control signal transmitter at an entrance to said area and using a second control signal transmitter at an exit to said area, the method comprising the steps of:
  generating a first control signal at an entrance to said restricted-communication area, said control signal being different from the electromagnetic signal conveying said cellular telephone audio signal;
  generating a second control signal at an exit from said restricted-communication area, said control signal being different from the electromagnetic signal conveying said cellular telephone audio signal;
  generating a restricted-communication signal within the cellular phone upon receipt of said first control signal, until receipt of said second control signal;
  applying the restricted-communication signal to the radio frequency transmitter to inhibit transmission within the restricted-communication zone; and
  overriding the restricted-communication signal within the cellular telephone in response to a command sent over said radio-frequency carrier, thereby permitting radio-frequency carrier transmission within the restricted-communication area.

38. A method as defined in claim 37 wherein said control signal is ultrasonic.

39. A method as defined by claim 38 wherein the cellular telephone includes a microphone responsive to the voice of the user, said control signal receiver subsystem utilizes said microphone for receiving said ultrasonic control signal.

40. A method as defined in claim 37 wherein said control signal is infrared.

41. A method ad defined in claim 37 wherein said control signal is a radio frequency signal.

42. A method for selectively restricting the emission of a radio frequency signal from a cellular telephone within a defined restricted-communication area using a plurality of control signal transmitters which are coupled to a synchronization mechanism, comprising the steps of:
  generating synchronization signals to enable said control signal transmitters, such that each said transmitter is enabled to send the control signal within a maximum time interval after it sent the previous control signal;
  generating, from each enabled control signal transmitter, a control signal within the defined restricted-communication zone, said control signal being different from the electromagnetic signal conveying said cellular telephone audio signal;
  generating a restricted-communication signal within the cellular phone upon receipt of said control signal, and for a predetermined time thereafter that is larger than said maximum time interval; and
  applying the restricted-communication signal to the transmitter to prevent transmission of the radio frequency signal within the restricted-communication zone.

43. A method as defined in claim 42 wherein said synchronization signals uses common 60 Hz household power to establish which of said transmitters send their control signal during each half of the 60 Hz cycle.

44. A method as defined in claim 42 wherein said control signal is ultrasonic.

45. A method as defined in claim 44 wherein said cellular telephone includes a microphone responsive to the voice of the user, and said control signal receiver subsystem utilizes said microphone for receiving said ultrasonic control signal.

46. A method as defined in claim 42 wherein said control signal is infrared.

47. A method as defined in claim 42 wherein said control signal is a radio frequency signal.

48. A system for selectively restricting the ringing operation of a cellular telephone within a defined quiet zone, comprising:
  a plurality of transmitters for repetitively generating a control signal within the quiet zone, said control signal being different from the electromagnetic signal conveying said cellular telephone audio signal;
  a synchronization subsystem whereby at least one said control signal transmitter is prevented from transmitting while at least one other said control signal transmitter transmits its control signal, each said control transmitter transmitting its control signal repetitively within a maximum time interval between said transmissions;
  the cellular telephone including a ringer circuit subsystem for audibly signaling the receipt of a call;
  a receiver within the cellular phone responsive to said control signal for generating a muting signal upon receipt of said control signal and for a time thereafter longer than the longest time between any said control signal transmitter's repetition rate; and
  a muting circuit subsystem responsive to said muting signal for inhibiting the operation of said ringer circuit subsystem, to inhibit ringing of said cellular phone within the quiet zone.

49. A system as defined in claim 48 wherein said synchronization subsystem uses common 60 Hz household power to establish which of said transmitters send their control signals during each half of the 60 Hz cycle.

50. A system as defined in claim 48 wherein said control signal is ultrasonic.

51. A system as defined in claim 50 wherein the cellular telephone includes a microphone responsive to the voice of the user and said control signal receiver subsystem utilizes said microphone for receiving said ultrasonic control signal.

52. A system as defined in claim 48 wherein said control signal is infrared.

53. A system as defined in claim 48 wherein said control signal is a radio frequency signal.

54. A cellular telephone wherein its ringing is inhibited upon receipt of a control signal generated from any of a plurality of control signal transmitters within a defined quiet zone, in which a synchronization subsystem coupled to said transmitters causes at least one said control signal transmitter to avoid transmitting while at least one other said control signal transmitter transmits its control signal, each said control signal transmitting its control signal repetitively within a maximum time interval between said transmissions, said cellular telephone comprising:
  a ringing circuit for audibly signaling the receipt of a call;
  a receiver responsive to the control signal for generating an internal muting signal upon receipt of the control signal and for a period of time thereafter longer than said maximum time interval; and
  a muting circuit responsive to said muting signal for inhibiting the operation of said ringing circuit, with receipt of said control signal to inhibit ringing of the telephone in the quiet zone.

55. A cellular telephone as defined in claim 54 wherein said synchronization subsystem uses the common 60 Hz power cycle.

56. A cellular telephone as defined in claim 54 wherein said control signal is ultrasonic.

57. A cellular telephone as defined n claim 56 wherein the cellular telephone includes a microphone responsive to the voice of the user, and said control signal receiver subsystem utilizes said microphone for receiving said ultrasonic control signal.

58. A cellular telephone as defined in claim 54 wherein said control signal is infrared.

59. A cellular telephone as defined in claim 54 wherein said control signal is a radio frequency signal.

60. A method for selectively restricting the operation of the ringer of a cellular telephone within a defined quiet zone using a plurality of control signal transmitters, comprising the steps of:
  generating synchronization signals to enable said control signal transmitters, such that each said enable is generated within a maximum time interval after it was last sent;
  generating, from each enabled control signal transmitter, a control signal within the defined quiet zone, said control signal being different from the electromagnetic signal conveying said cellular telephone audio signal;
  generating a muting signal within the cellular phone upon receipt of said control signal and for a time thereafter longer than said maximum time interval; and
  applying the muting signal to the ringer circuit to inhibit operation concurrently with the receipt of the control signal to prevent ringing of the telephone within the quiet zone.

61. A method as defined in claim 60 wherein said synchronization signals uses common 60 Hz household power to establish which of said transmitters send their control signal during each half of the 60 Hz Cycle.

62. A method as defined by claim 60 wherein said control signal is ultrasonic.

63. A method as defined in claim 62 wherein said cellular telephone includes a microphone responsive to the voice of the user, and said control signal receiver microphone is responsive to the voice of the user, and said control signal receiver subsystem utilizes said microphone for receiving said ultrasonic control signal.

64. A method as defined by claim 60 wherein said control signal is infrared.

65. A method as defined by claim 60 wherein said control signal is a radio frequency signal.

66. A system for selectively restricting radio frequency transmissions of a restricted-device within a restricted-communication area, the restricted device including a receiver, a device transmitter and a microcontroller operatively coupled to the device transmitter and receiver, the system comprising:
  a first transmitter adapted to generate a first control signal, the first transmitter located proximate to the restricted-communication area; and
  a second transmitter adapted to generate a second control signal, the second transmitter located proximate to the restricted-communication area at a predetermined distance from the first transmitter,
  wherein the microcontroller is configured to monitor the first and second control signals transmitted by the first and second transmitters and received via the receiver, and to control radio frequency transmissions from the device transmitter based on the order of receipt of the first control signal and the second control signal.

67. The system of claim 66, wherein in response to receipt of the first control signal followed by receipt of the second control signal within a first predetermined time period, the microcontroller disables the device transmitter to prevent radio frequency transmissions for a second predetermined time period, and wherein in response to receipt of the second control signal followed by receipt of the first control signal within a third predetermined time period, the microcontroller enables the device transmitter to permit radio frequency transmissions.

68. The system of claim 66, wherein the restricted device is selected from the group consisting of a cellular telephone, a PDA, a pager, and a wrist watch.

69. The system of claim 66, wherein each of the first and second control signals are implemented using a wireless technology selected from the group consisting of an ultrasound technology, an infrared technology, and a radio frequency technology.

70. The system of claim 69, wherein the restricted device further comprises a microphone coupled to the microcontroller, the microphone adapted to receive the first and second control signals implemented using the ultrasound technology.

71. The system of claim 66, wherein the first transmitter is located proximate to an entrance of the restricted-communication area, and wherein the second transmitter is located proximate to an interior location of the restricted-communication area.

72. A method for selectively restricting the radio frequency transmissions of a restricted device within a restricted-communication area, the restricted device including a receiver, a device transmitter, and a microcontroller operatively coupled to the device transmitter and the receiver, the method comprising:
  receiving a first control signal from a first transmitter located proximate to the restricted-communication area;
  receiving a second control signal from a second transmitter located proximate to the restricted-communication area; and
  controlling radio frequency transmissions from the device transmitter based on an order of receipt of the first control signal and the second control signal.

73. The method of claim 72, further comprising:
  disabling the device transmitter to prevent radio frequency transmission for a first predetermined time period upon receipt of the first control signal followed by receipt of the second control signal within a second predetermined time period; and
  enabling the device transmitter to permit radio frequency transmission upon receipt of the second control signal followed by receipt of the first control signal within a third predetermined time period.

74. The method of claim 72, wherein the restricted device is selected from the group consisting of a cellular telephone, a PDA, a pager, and a wristwatch.

75. The method of claim 72, wherein each of the first and second control signals are implemented using a wireless technology selected from the group consisting of an ultrasound technology, an infrared technology, and a radio frequency technology.

76. The method of claim 75, wherein the restricted device further comprises a microphone coupled to the microcontroller, the microphone adapted to receive the first and second control signals implemented using the ultrasound technology.

77. The method of claim 72, wherein the first transmitter is located proximate to an entrance of the restricted-communication area, and wherein the second transmitter is located proximate to an interior location of the restricted-communication area.

78. A system for selectively muting a restricted device within a defined area, the restricted device including a receiver, an audible notification mechanism, and a microcontroller operatively coupled to the receiver and audible notification mechanism, the system comprising:
 a first transmitter adapted to generate a first control signal, the first transmitter located proximate to the defined area; and
 a second transmitter adapted to generate a second control signal, the second transmitter located proximate to the defined area at a predetermined distance from the first transmitter,
 wherein the microcontroller is programmed to monitor the first and second control signals received via the receiver, and to control the audible notification mechanism based on an order of receipt of the first control signal and the second control signal.

79. The system of claim 78, wherein in response to receipt of the first control signal followed by receipt of the second control signal within a first predetermined time period, operation of the audible notification mechanism is restricted for a second predetermined time period, and wherein in response to receipt of the second control signal followed by receipt of the first control signal within a third predetermined time period, operation of the audible notification mechanism is allowed.

80. The system of claim 78, wherein the restricted device is a member of the group consisting of a cellular telephone, a PDA, a pager, and a wrist watch.

81. The system of claim 78, wherein each of the first and second control signals are implemented using a wireless technology selected from the group consisting of an ultrasound technology, an infrared technology, and a radio frequency technology.

82. The method of claim 81, wherein the restricted device further comprises a microphone coupled to the microcontroller, the microphone adapted to receive the first and second control signals implemented using the ultrasound technology.

83. A method for selectively controlling an audible notification mechanism of a restricted device within a defined area, the restricted device including a receiver, a device transmitter, and a microcontroller operatively coupled to the device transmitter and receiver, the method comprising:
 receiving a first control signal from a first transmitter located proximate to the defined area; and
 receiving a second control signal from a second transmitter located proximate to the defined area; and
 controlling operation of the audible notification mechanism based on an order of receipt of the first control signal and the second control signal.

84. The method of claim 83, further comprising:
 muting the audible notification mechanism for a first predetermined time period upon receipt of the first control signal followed by receipt of the second control signal within a second predetermined time period; and
 unmuting the audible notification mechanism to allow operation upon receipt of the second control signal followed by receipt of the first control signal within a third predetermined time period.

85. The method of claim 83, wherein first and second control signals are implemented using a wireless technology selected from the group consisting of an ultrasound technology, an infrared technology, and a radio frequency technology.

86. The method of claim 85, wherein the restricted device further comprises a microphone coupled to the microcontroller, the microphone adapted to receive the first and second control signals implemented using the ultrasound technology.

* * * * *